United States Patent [19]

Nilssen

[11] Patent Number: 5,977,721
[45] Date of Patent: Nov. 2, 1999

[54] CONTROLLED POWER-FACTOR-CORRECTED BALLAST

[76] Inventor: Ole K. Nilssen, Caesar Dr., Barrington, Ill. 60010

[21] Appl. No.: 07/728,042

[22] Filed: Jul. 8, 1991

Related U.S. Application Data

[63] Continuation of application No. 07/615,137, Nov. 19, 1990, abandoned, which is a continuation-in-part of application No. 07/250,990, Sep. 29, 1988, abandoned, which is a continuation of application No. 06/693,188, Jan. 22, 1985, abandoned, which is a continuation-in-part of application No. 06/454,425, Feb. 22, 1983, abandoned, said application No. 07/615,137, is a continuation-in-part of application No. 07/153,572, Feb. 8, 1988, abandoned, which is a continuation of application No. 07/030,554, Mar. 27, 1987, abandoned, which is a continuation of application No. 06/693,188, Jan. 22, 1985, abandoned, which is a continuation-in-part of application No. 06/454,425, Feb. 22, 1983, abandoned.

[51] Int. Cl.⁶ .................................................. H05B 37/02
[52] U.S. Cl. .................... 315/205; 315/247; 315/DIG. 7; 363/37
[58] Field of Search .................................. 315/205, 247, 315/DIG. 7, 207 R, 219, 225, 265; 363/37, 17, 45, 132; 323/207; 307/45, 46

[56] References Cited

U.S. PATENT DOCUMENTS

| | | | |
|---|---|---|---|
| 2,763,813 | 9/1956 | McKinney et al. | 315/205 |
| 2,777,973 | 1/1957 | Steele et al. | 315/205 |
| 3,913,002 | 10/1975 | Steigerwald et al. | 315/247 X |
| 4,017,785 | 4/1977 | Perper | 315/224 |
| 4,053,813 | 10/1977 | Kornrumpf et al. | 315/206 |
| 4,109,307 | 8/1978 | Knoll | 315/247 |
| 4,127,893 | 11/1978 | Goepel | 363/37 |
| 4,184,128 | 1/1980 | Nilssen | 363/22 |
| 4,188,660 | 2/1980 | Knoll | 315/205 X |
| 4,358,716 | 11/1982 | Cordes | 363/37 |
| 4,370,600 | 1/1983 | Zansky | 315/DIG. 7 |
| 4,388,561 | 6/1983 | Koshimura et al. | 315/247 |
| 4,392,086 | 7/1983 | Ide et al. | 315/205 |
| 4,426,564 | 1/1984 | Steigerwald et al. | 363/132 |
| 4,441,054 | 4/1984 | Bay | 315/219 |
| 4,808,887 | 2/1989 | Fähnrich et al. | 315/247 |
| 5,012,161 | 4/1991 | Borowiec et al. | 315/247 |

FOREIGN PATENT DOCUMENTS

| | | | |
|---|---|---|---|
| 2472297 | 6/1981 | France | 363/37 |
| 2613395 | 10/1977 | Germany | 363/17 |
| 2808419 | 8/1979 | Germany | 363/45 |
| 144141 | 9/1980 | Germany | 363/126 |
| 117473 | 9/1980 | Japan | 363/37 |
| 49682 | 5/1981 | Japan | 363/37 |

(List continued on next page.)

OTHER PUBLICATIONS

Dale et al. "Conversion of Incandescent Lamp Sockets to Fluorescent in the Home Market" Mar. 1976 pp. 18–23 Lighting & Design Application.

*Primary Examiner*—Michael B Shingleton

[57] ABSTRACT

Subject electronic ballast draws power from the power line with a power factor higher than 90%. The ballast consists of a power-factor-correcting rectifier circuit and an inverter circuit that provides a high-frequency squarewave voltage across a series-resonant L-C circuit to which a fluorescent lamp is connected. The rectifier circuit consists of a full-bridge rectifier connected with its AC input terminals to the power line and with its positive/negative output terminals across: i) the inverter circuit; ii) a series-combination of a first rectifier and a first electrolytic capacitor, the first rectifier being connected with its cathode to the positive output terminal and with its anode to a first junction, the first capacitor being connected between this first junction and the negative output terminal; and iii) a series-combination of a second rectifier and a second electrolytic capacitor, the second rectifier being connected with its anode to the negative output terminal and with its cathode to a second junction, the second capacitor being connected between this second junction and the positive output terminal. A separate rectifier means is connected between the two junctions in such manner as to permit current to flow freely from the second junction to the first junction.

31 Claims, 2 Drawing Sheets

FOREIGN PATENT DOCUMENTS

| | | | |
|---|---|---|---|
| 125970 | 10/1981 | Japan | 363/37 |
| 220081 | 12/1984 | Japan | 363/37 |
| 51463 | 3/1985 | Japan | 363/37 |
| 101820 | 5/1986 | Japan | 363/37 |
| 173322 | 8/1986 | Japan | 363/37 |
| 89068 | 4/1988 | Japan . | |
| 459833 | 7/1975 | Russian Federation | 363/47 |
| 736068 | 5/1980 | U.S.S.R. | 323/282 |
| 2072968 | 10/1981 | United Kingdom | 315/266 |
| 9116802 | 10/1991 | WIPO | 315/205 |

CONTROLLED POWER-FACTOR-CORRECTED BALLAST

RELATED APPLICATIONS

The present application is a Continuation of Ser. No. 07/615,137 filed Nov. 19, 1990, now abandoned; which application was a Continuation-in-Part of Ser. No. 07/250,990 filed Sep. 29, 1988, now abandoned; which is a Continuation of Ser. No. 06/693,188 filed Jan. 22, 1985, now abandoned; which was a Continuation-in-Part of Ser. No. 06/454,425 filed Feb. 22, 1983, now abandoned.

Application Ser. No. 07/615,137 was also a Continuation-in-Part of Ser. No. 07/153,572 filed Feb. 8, 1988, now abandoned; which is a Continuation of Ser. No. 07/030,554 filed Mar. 27, 1987, now abandoned; which was a Continuation of Ser. No. 06/693,188 filed Jan. 22, 1985, now abandoned; which was a Continuation-in-Part of Ser. No. 06/454,425 filed Feb. 22, 1983, now abandoned.

BACKGROUND OF THE INVENTION

1. Field of the Invention

The present invention relates to electronic means for improving the power factor of power-line-operated inverter-type ballasts for fluorescent lamps.

2. Description of Prior Art

In connection with power-line-operated inverter-type ballasts for fluorescent lamps, it is often important that the power drawn from the power line be drawn with a higher power factor than that naturally resulting with such power supplies.

For instance, without any power factor correction means, the power factor associated with ordinary power-line-operated inverter-type fluorescent lamp ballasts will be on the order of 60% or less. On the other hand, in the most common of all applications of such ballasts, it is important that the power be at least 90%.

The conventional way of improving or correcting the power factor of an inverter-type power supply involves the use of an energy-storing inductor means placed on the power-input-side of the inverter-type power supply, either just in front of or just behind the line voltage rectifier means.

One particular power factor correction circuit based on this principle is described in U.S. Pat. No. 4,075,476 entitled Sinusoidal Wave Oscillator Ballast Circuit; another one is described in U.S. Pat. No. 4,277,726 entitled Solid-State Ballast for Rapid-Start Type Fluorescent Lamps.

However, there are significant penalties in cost, weight, size and/or efficiency associated with the use of this method of power factor correction.

The present invention involves the use of electronic means for effecting the desired power factor correction, thereby obviating the need for said energy-storing inductor means and thereby greatly minimizing said penalties of cost, weight, size and efficiency.

SUMMARY OF THE INVENTION

1. Objects of the Invention

A first and general object of the present invention is that of providing for a cost-effective means by which to improve the power factor associated with the power drawn from the power line by a power-line-operated inverter-type power supply.

A second and more specific object is that of providing for a power factor correction means for electronic ballasts for gas discharge lamps.

These as well as other objects, features and advantages of the present invention will become apparent from the following description and claims.

2. Brief Description

Subject invention relates to electronic means for effecting improvement in the power factor associated with the power drawn from the power line by power-line-operated inverter-type power supplies.

In its basic preferred embodiment, the invention is represented by an inverter-type ballast for fluorescent lamps. In this ballast, the power is provided from the power line by way of a full-wave rectifier, and the resulting rectified but unfiltered voltage is provided to the inverter as its primary source of B+ power. However, connected in parallel with this primary source of B+ power is an auxiliary source of B+ power; and this auxiliary source takes over the supply of B+ voltage as soon as the instantaneous magnitude of the voltage available directly from the rectified power line voltage falls below a certain level.

This auxiliary source of B+ voltage is an energy storage capacitor, which capacitor is charged from the inverter output by way of a current-limiting inductor means during times when the voltage obtained directly from the rectified line voltage is of larger magnitude than the magnitude of the voltage on the capacitor.

In the specifically described basic preferred embodiment, the voltage on the power line is 120 Volt/60 Hz; and, to achieve an approximately 95% power factor, the voltage on the auxiliary B+ source is kept at about 100 Volt. Thus, as long as the instantaneous voltage on the power line is above this 100 Volt level, power is drawn directly therefrom and in substantial proportion to the magnitude of this instantaneous voltage.

DESCRIPTION OF THE PREFERRED EMBODIMENT

Description of the Drawings

Figure 1:
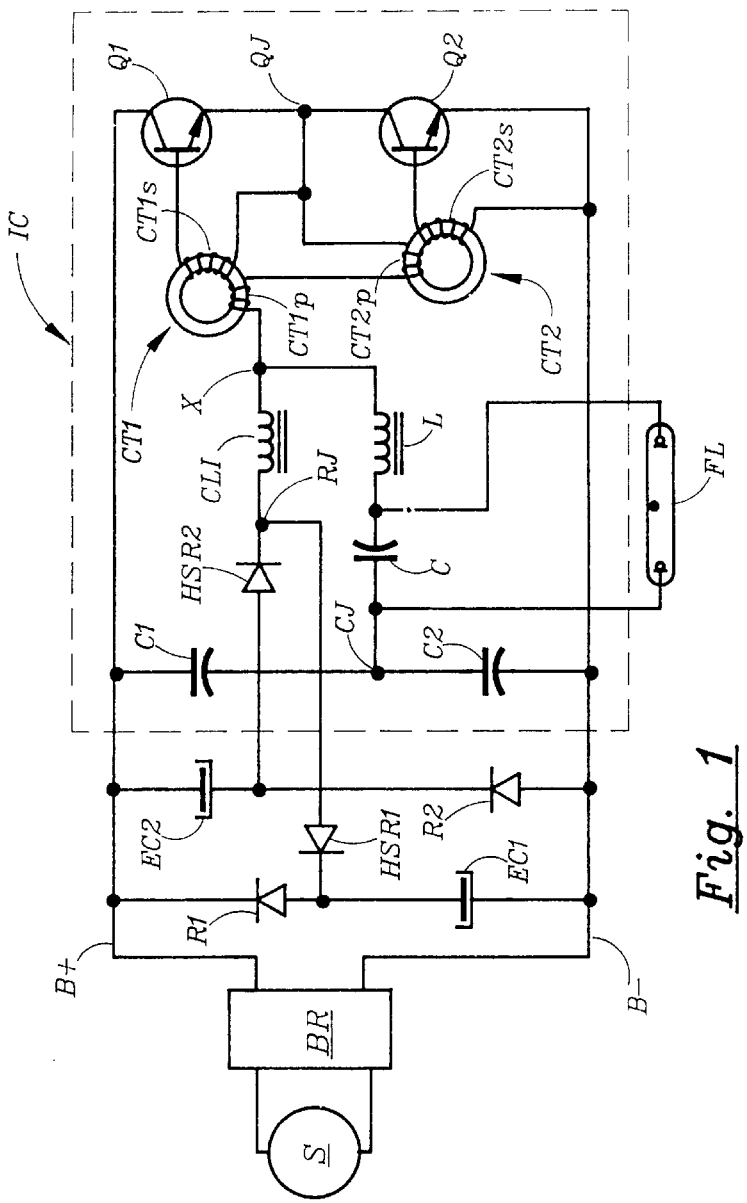
FIG. 1 schematically illustrates the basic preferred embodiment of the invention.

In FIG. 1, a source S of 120 Volt/60 Hz voltage is applied to a full-wave bridge rectifier BR, the unidirectional voltage output of which is applied directly between a B+ bus and a B− bus, with the positive voltage being connected to the B+ bus.

Between the B+ bus and the B− bus are connected a series-combination of two transistors Q1 and Q2 as well as a series-combination of two film-type capacitors C1 and C2.

An energy-storing electrolytic capacitor EC1 is connected in series with a rectifier R1, with the anode of R1 being connected with the positive terminal of EC1. The negative terminal of EC1 is connected directly with the B− bus; and the cathode of R1 is connected directly with the B+ bus.

Another energy-storing electrolytic capacitor EC2 is connected in series with a rectifier R2, with the cathode of R2 being connected to the negative terminal of EC2. The positive terminal of EC2 is connected directly with the B+ bus; and the anode of rectifier R2 is connected directly with the B− bus.

The secondary winding CT1s of positive feedback current transformer CT1 is connected directly between the base and the emitter of transistor Q1; and the secondary winding CT2s of positive feedback current transformer CT2 is connected directly between the base and the emitter of transistor Q2.

The collector of transistor Q1 is connected directly with the B+ bus; the emitter of transistor Q2 is connected directly with the B− bus; and the emitter of transistor Q1 is connected directly with the collector of transistor Q2, thereby forming junction QJ.

One terminal of capacitor C1 is connected directly with the B+ bus, while the other terminal of capacitor C1 is connected with junction CJ. One terminal of capacitor C2 is connected directly with the B− bus, while the other terminal of capacitor C2 is connected directly with junction CJ.

An inductor L and a capacitor C are connected in series with one another and with the primary windings CT1p and CT2p of transformers CT1 and CT2.

The series-connected primary windings CT1p and CT2p are connected directly between junction QJ and a point X. Inductor L is connected with one of its terminals to point X and with the other of its terminals to one of the terminals of capacitor C. The other terminal of capacitor C is connected directly with junction CJ.

A fluorescent lamp FL is connected in parallel circuit across capacitor C.

An current-limiting inductor CLI is connected with one of its terminals to point X. The other terminal of CLI is connected directly to the junction RJ between the anode of a high-speed rectifier HSR1 and the cathode of another high-speed rectifier HSR2. The cathode of HSR1 is connected directly with the positive terminal of electrolytic capacitor EC1; and the anode of HSR2 is connected directly with the negative terminal of electrolytic capacitor EC2.

Part of the circuit arrangement of FIG. 1 is a so-called half-bridge inverter circuit and is designated as IC.

Values and designations of the various parts of the circuit of FIG. 1 are listed as follows:

| | |
|---|---|
| Output of Source S: | 120 Volt/60 Hz; |
| Bridge rectifier BR: | a bridge of four 1N4004; |
| Capacitors C1 & C2: | 1 uF/100 Volt(Film-Type); |
| Rectifiers R1 and R2: | 1N4004; |
| Electrolytic Capacitors EC1 & EC2: | 47 uF/160 Volt; |
| High-Speed Rectifiers HSR1 and HSR2: | 1N4937; |
| Transistors Q1 & Q2: | Motorola MJE13002; |
| Capacitor C: | 15 nF/630 Volt(High-Q); |
| Inductor L: | 130 turns of three twisted strands of #30 wire on a 3019P-L00-3C8 Ferroxcube Ferrite Pot Core with a 120 mil air gap; |
| Inductor CLI: | 95 turns of #31 wire on a Ferroxcube 1408P-L00-3C8 Ferrite Pot Core with a 40 mil air gap; |
| Transformers CT1 & CT2: | Wound on Ferroxcube Toroids 213T050 of 3E2A Ferrite Material with three turns of #26 wire for the primary windings and ten turns of #30 wire for the secondary windings; |
| Fluorescent Lamp FL: | Two Sylvania Octron F032/31K Fluorescent Lamps Connected in series. |

The frequency of inverter oscillation associated with the component values identified above is approximately 33 kHz.

Figure 2:
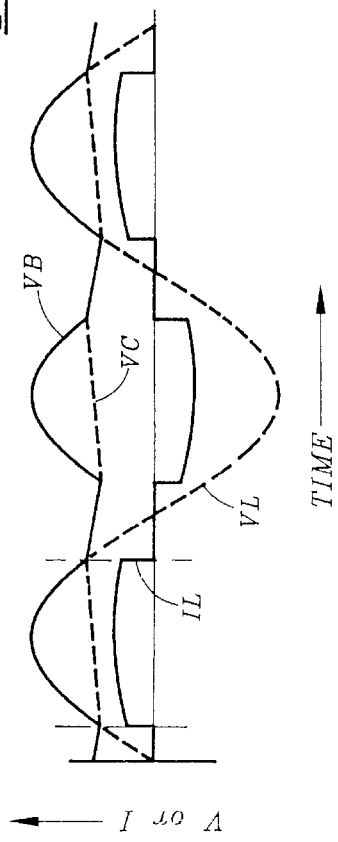
FIG. 2 illustrates typical voltage and current waveforms associated with the basic preferred embodiment of FIG. 1.

FIG. 2 illustrates the voltage V and the current I versus time T for some of the voltage and current waveforms associated with the circuit of FIG. 1.

The waveform identified as VL represents the voltage provided by the line voltage source S of FIG. 1. The waveform identified as IL represents the current drawn from this line voltage source.

The waveform identified as VB represents the voltage present between the B− bus and the B+ bus of FIG. 1; and the waveform identified as VC represents the voltage across either one of the energy-storing electrolytic capacitors EC1 or EC2 of FIG. 1.

Figure 3:
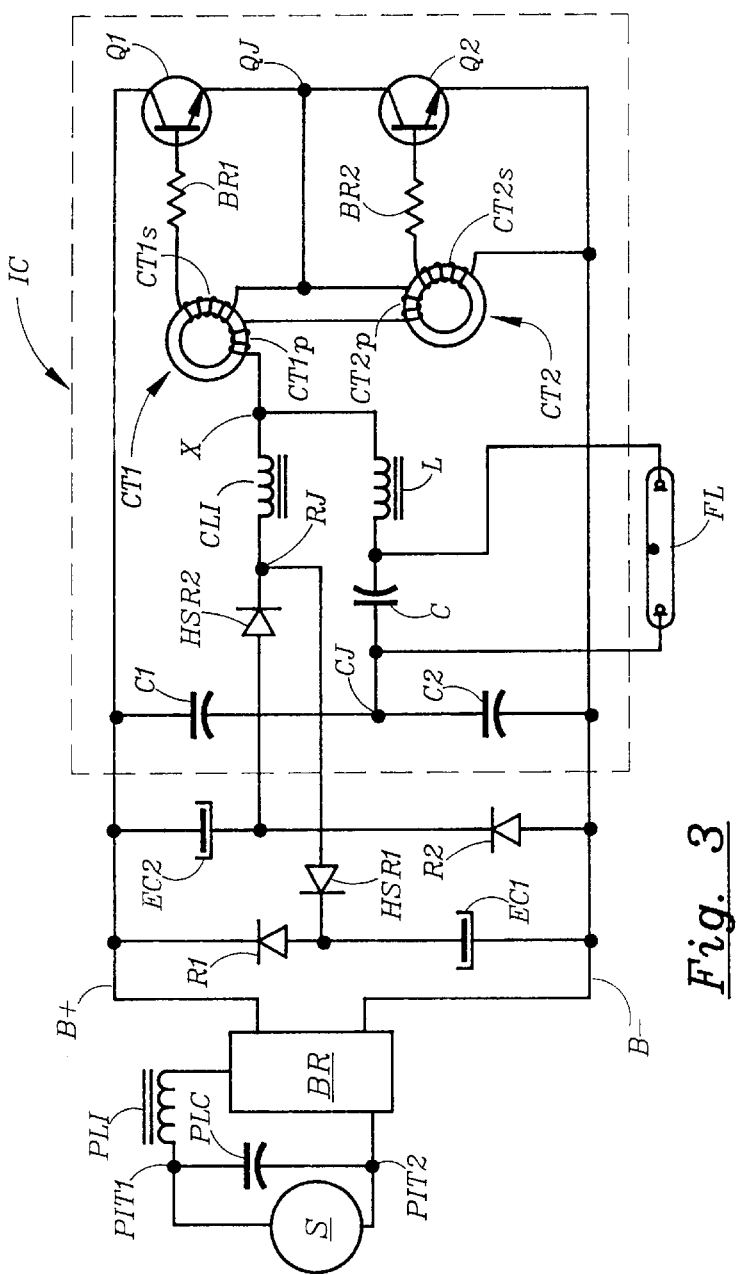
FIG. 3 schematically illustrates a modified version of the basic preferred embodiment.

The circuit arrangement of FIG. 3 is identical to that of FIG. 1, except for: (i) a first base resistor BR1 connected in series with the base of transistor Q1; (ii) a second base resistor BR2 connected in series with the base of transistor Q2; (iii) a power line capacitor PLC connected across power input terminals PIT1 and PIT2; and (iv) a power line inductor PLI connected in series between power input terminal PIT1 and one of the AC input terminals of bridge rectifier BR.

Figure 4:
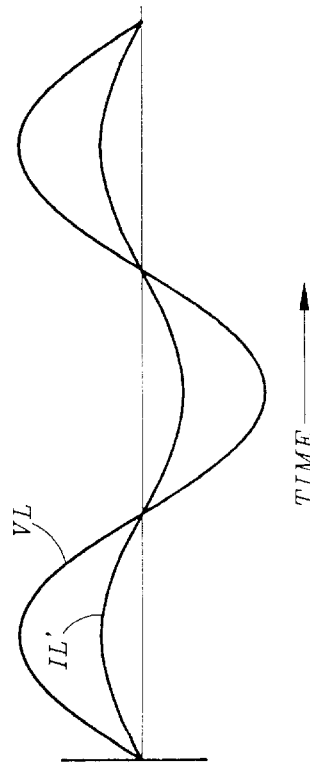
FIG. 4 illustrates various voltage and current waveforms associated with the modified version.

FIG. 4 illustrates the modified line current IL' versus the line voltage VL associated with the modified preferred embodiment of FIG. 3.

Description of Operation

With reference to FIG. 2, the operation of the circuit of FIG. 1 may be explained as follows.

In FIG. 1, the source S represents an ordinary electric utility power line, the voltage from which is applied directly to the bridge rectifier identified as BR. This bridge rectifier is of conventional construction and provides for the rectified line voltage to be applied to the inverter circuit IC by way of the B+ bus and the B− bus.

Since this rectified line voltage is provided by way of a rectifier means, it is possible to provide for an auxiliary source of voltage to be connected in parallel between the B+bus and the B− bus—provided that this auxiliary source is also connected by way of a rectifier means. That way, the voltage actually provided between the B+ bus and the B− bus will be the voltage of the source with the largest instantaneous magnitude.

In other words, the current actually provided to the inverter circuit IC of FIG. 1 will come either from the power line or from (either or both of) the two energy-storing electrolytic capacitors EC1 and EC2—depending upon which voltage is largest at the moment. Thus, as long as the absolute magnitude of the voltage on the power line is larger than the voltage on either of the two capacitors, the current will come from the power line; otherwise, it will come from either or both of the two electrolytic capacitors.

The half-bridge inverter circuit IC of FIG. 1 operates in a manner that is analogous with circuits previously described in published literature, as for instance in U.S. Pat. No. 4,184,128 entitled High Efficiency Push-Pull Inverters.

The inverter IC is shown without any means for initiating inverter oscillation. However, once power is applied, oscillation can be initiated simply by momentarily connecting a 50 nF capacitor between the B+ bus and the base of transistor Q2.

Capacitors C1 and C2 are so sized that, in comparison to the energy being used by the inverter over a period comparable to the cycle-period of the power line voltage, they store a negligible amount of energy; which implies that they will not have any significant impact on the gross shape of the voltage between the B+ bus and the B− bus, which is the waveform identified as VB in FIG. 2.

The purpose of capacitors C1 and C2 is that of providing for a relatively low impedance path for the 33 kHz current associated with the half-bridge inverter action.

The output of the half-bridge inverter is a substantially squarewave 33 kHz AC voltage, which is provided between point X and junction CJ. Across this output is connected a resonant or near-resonant L-C series circuit—with the fluorescent lamp being connected in parallel with the tank-capacitor thereof.

The resonant or near-resonant action of the L-C series circuit provides for appropriate lamp operating voltages and currents; which is to say that it provides for lamp ballasting.

One particularly important feature of this method of lamp ballasting relates to the fact that it exhibits exceptionally good regulation: as the magnitude of the 33 kHz squarewave AC voltage applied across the L-C series circuit varies by a certain relative amount, the net resulting lamp power varies by a smaller relative amount.

The reason for this feature of good regulation relates to the well known negative resistance characteristic of fluorescent lamps: as lamp current increases, the correspondingly required lamp voltage decreases, which implies that the lamp resistance decreases relatively even more. In combination with an L-C series-resonant circuit, this characteristic yields the overall effect that, as the lamp power increases, the L-C circuit Q-multiplication factor decreases, thereby tending to offset the increase in lamp power—and vice versa for decreasing lamp power.

(In other words, the ability of the resonant L-C circuit to provide power to the lamp load connected in parallel with its tank-capacitor is proportional to the Q-factor of the circuit; and this Q-factor increases as the power to the lamp decreases.)

In the inverter, transistors Q1 and Q2 are in effect switches that are turned ON and OFF in obverse synchrony at a 33 kHz rate. Thus, junction QJ—which, but for a minute voltage drop across the primary windings of current transformers CT1 and CT2, is electrically the same as point X—is alternately connected with the B+ bus and the B− bus.

Connected to point X, and thereby alternatingly (at a rate of 33 kHz) to the B+ bus and the B− bus, is the current-limiting inductor CLI. By way of this current-limiting inductor and the two high-speed rectifiers HSR1 and HSR2, the 33 kHz squarewave voltage at point X is applied to the two energy-storing electrolytic capacitors EC1 and EC2; which implies that current will be provided to charge these two capacitors as long as the instantaneous voltage at point X is larger in magnitude than the voltage across the capacitors.

In other words, whenever the instantaneous absolute magnitude of the power line voltage is larger than that of the voltage across capacitors EC1 and EC2, these two capacitors will be charged by way of the current-limiting inductor CLI and the two high-speed rectifiers HSR1 and HSR2.

Since the frequency at which these capacitors are being charged is very high compared with the frequency of the power line voltage, the physical size of the current-limiting inductor CLI is very small compared with the size that would have been required if the charging and current-limitation had been performed at the frequency of the power line voltage.

At a given load, the inductance-value of the current-limiting inductor CLI determines the amount of charging current applied to the energy-storing capacitors, and therefore determines the magnitude of the (average) voltage at which the two capacitors operate. In the particular circuit of FIG. 1, the inductance-value of CLI has been so chosen that the average voltage across the electrolytic capacitors stays at about 100 Volt; which implies that the operating current for the inverter will be drawn directly from the power line as long as the absolute magnitude of the power line voltage is higher than about 100 Volt (see waveform IL of FIG. 2), but will be drawn from the electrolytic capacitors whenever the absolute magnitude of the power line voltage is lower than about 100 Volt.

Due to the natural characteristics of the series-resonant ballasting method used, the amount of power provided to the fluorescent lamp does not change substantially over the voltage range associated with the ripple on the inverter DC supply voltage (VB in FIG. 2). As a result, lamp ionization remains essentially constant at all times throughout the ripple cycle; and lamp efficiency is therefore maintained essentially at the same level as would have been achieved without any ripple on the inverter DC supply voltage.

However, had the inverter DC supply voltage been allowed to fall all the way to zero—which would have been the case without the presence of the auxiliary power source represented by the two electrolytic capacitors—the natural regulation ability of the series-resonant ballasting circuit would of course not have been able to compensate, and lamp ionization could not have been maintained throughout the ripple cycle; which would have resulted in significant reduction of lamp efficiency.

The power factor at which power is drawn from the power line by the circuit arrangement of FIG. 1 is over 90%, and—with proper choice of the inductance value of current-limiting inductor CLI—can be made to approach 95% for a given amount of power delivered by the inverter circuit to the load (i.e., fluorescent lamp FL).

More particularly, the power factor will be about 90% with the inductance value of CLI being very large (even infinitely large), regardless of the amount of power delivered by the inverter; and, for a given load, will reach a maximum of nearly 95% as the inductance value is reduced to its optimum value for that given load.

In other words, as the inductance value of inductor CLI is gradually increased, the amount of charge provided to electrolytic (energy-storing) capacitors EC1 and EC2 from the inverter output at point X gradually diminishes. Eventually, as the inductance value becomes very large, the amount of charge provided to capacitors EC1 and EC2 from point X becomes very small. As a result, the magnitude of the DC voltage on electrolytic capacitors EC1 and EC2 will gradually diminish in a corresponding manner.

However, due to the fundamentally inherent nature of the circuit arrangement of FIG. 1, the magnitude of the DC voltage on capacitors EC1 and EC2 is manifestly prevented from diminishing below half of the peak magnitude of the power line voltage; which, with a power line voltage of 120 Volt RMS magnitude, means that the magnitude of the DC voltage on capacitors EC1 and EC2 can not diminish below about 84 Volt. Clearly, if the magnitude of the DC voltage on capacitors EC1 and EC2 were to diminish to a magnitude less that half of the peak magnitude of the power line voltage (or, more correctly, if the sum of the DC voltages on capacitors EC1 and EC2 were to become lower than this peak magnitude), the two capacitors would be series-charged (via rectifiers HRS1 and HRS2) directly from the full-wave-rectified power line voltage (which is provided between the B− bus and the B+ bus) at or near the point where this power line voltage reaches its peak magnitude.

Thus, if current limiting inductor CLI were to have a very large inductance value (or, if it were to be removed altogether), electrolytic capacitors EC1 and EC2 would be series-charged from the full-wave-rectified power line voltage each time this power line voltage comes close to its peak absolute magnitude, and would be parallel-discharged (into the load represented by inverter circuit IC) whenever the absolute instantaneous magnitude of the power line voltage falls below half its peak absolute magnitude. In other words, as the absolute instantaneous magnitude of the power line voltage dimishes below half its peak absolute magnitude, the DC supply voltage (as provided between the B− bus and the B+ bus) will be prevented (by the DC voltage present on capacitors EC1 and EC2) from falling below half the peak asolute magnitude of the power line voltage.

While a power factor of about 95% is perfectly adequate in most applications of power-line-operated inverter-type fluorescent lamp ballasts, there is another concomitant parameter that may be important in some situations; which parameter is that of harmonic distortion of the current drawn by the ballast from the power line. While in many situations such distortion is not of significant concern, there are other situations where it is important that such distortion be kept to a minimum.

The current drawn by the circuit arrangement of FIG. 1—when the power factor is maximized to about 95%—will have total harmonic distortion of more than 30%; which, in many situations, is unacceptably high. However, the total harmonic distortion of the power line current drawn by the circuit arrangement of FIG. 3 is far lower than that; and, by propoer choice of values for power line capacitor PLC and power line inductor PLI, can be made to be lower than 10%; which is sufficiently low to meet substantially all current requirements. As a colateral result, the power factor also improves.

With the power-factor-correction and harmonic-distortion-reducing means represented by elements PLC and PLI in place, current-limiting inductor CLI may be reduced in physical size (or even eliminated), while still maintaining an adequately high power factor as well as an acceptably low degree of total harmonic distortion.

With or without the power-factor-correction and harmonic-distortion-reducing means PLC/PLI in place, the magnitude of the DC supply voltage present between the B− bus and the B+ bus will have a substantial degree of magnitude modulation (ripple), especially so with current-limiting inductor CLI removed; and, as a concomitant result, the lamp current crest factor (i.e., the ratio between the peak magnitude and the RMS magnitude of the current flowing through the fluorescent lamp) may (in spite of the series-resonant L-C circuit's natural tendency to minimize the effect of such magnitude modulations) become higher than the normally accepted maximum of 1.7.

To further enhance the series-resonant L-C circuit's natural tendency to so minimize, the circuit arrangement of FIG. 3 has been modified by insertion of a resistor in series with the base of each of the inverter transistors. The effect of these resistors (BR1 and BR2) is that of causing the ON-time of the transistors to shorten at higher levels of inverter output current; which results in a negative feedback effect operative to reduce the magnitude of the lamp current during periods of high-magnitude DC supply voltage relatively more than during periods of low-magnitude DC supply voltage. As a net overall effect, the resulting lamp current crest factor significantly improves.

Additional Comments (a) It is noted that the concept of power factor correction herein disclosed is not limited to being used just in connection with fluorescent lamp ballasts, nor just with half-bridge inverters. On the contrary, the basic concept can be applied to a wide variety of inverter circuits and applications—especially in connection with self-oscillating inverters.

(b) It is also noted that an alternative way of looking at the arrangement of FIG. 1 is that of considering it as an arrangement for providing auxiliary DC power for the inverter—this auxiliary power being provided by way of energy-storing means, which in turn are being intermittently replenished with energy from the output of the inverter. Thus, the inverter will operate properly from rectified but unfiltered AC line voltage—without permitting the inverter to cease oscillating or the fluorescent lamp to become de-ionized during the periods where the absolute magnitude of the line voltage falls to very low values.

(c) The power-factor-correcting and harmonic-distortion-reducing effect attained by way of elements PLC and PLI can be obtained as well with various other arrangements. For instance: (i) an inductor may be placed in series with the DC output terminals of bridge rectifier BR instead of in series with its AC input terminals; (ii) a capacitor may be placed across the AC input terminals of bridge rectifier BR instead of (or in addition to) the capacitor connected between power input terminals PIT1 and PIT2; (iii) a capacitor and an inductor may be series-connected to form a series-combination, and this series-combination may be connected in series with the AC input terminals of bridge rectifier BR; and (iv) etc.

(d) Current waveform IL' of FIG. 4 may be more or less similar to a sinewave, depending upon the particular values of capacitor PLC and inductor PLI. Also, the phasing with respect to line voltage VL is affected by these particular values.

(e) A basic difference between the circuit arrangement of FIG. 4 and the conventional power-factor-improvement methods referred-to in the "Description of Prior Art" hereinbefore, relates to the physical sizes and specifications of the required power-factor-correcting inductor and capacitor means. Since part of the power factor-correction is effected by the means described in connection with the circuit arrangement of FIG. 1, the added inductor and capacitor only need to effect an additional or incremental amount of improvement. Consequently, for a given set of overall performance requirements, the physical sizes of the added capacitor and inductor may be substantially smaller than be the case when the full amount of power factor correction has to be accomplished by an inductor-capacitor combination.

(f) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
    an electric power source providing an alternating source voltage at a pair of source terminals;
    full-wave-rectifier means having a pair of AC input terminals and a pair of DC output terminals; the AC input terminals being connected with the source terminals; the DC output terminals including a B− terminal and a B+ terminal; and
    loading means connected with the DC output terminals; the loading means being characterized by including:

(A) a first energy-storing capacitor connected between the B− terminal and a first junction;
a first rectifier having an anode connected with the first junction and a cathode connected with the B+ terminal;
a second energy-storing capacitor connected between a second junction and the B+ terminal; and
a second rectifier having a cathode connected with the second junction and an anode connected with the B− terminal;

(B) an inverter means "connected in circuit" with the first and second energy-storing capacitors as well as with the first and second rectifiers; the inverter means being operative to provide a high-frequency current at an inverter output; and (C) a gas discharge lamp connected with the inverter output.

2. The arrangement of claim 1 wherein is provided a unidirectional means operative: (i) to permit the substantially free flow of positive current from the second junction to the first junction; and (ii) to prevent any substantive flow of positive current from the first junction to the second junction.

3. The arrangement of claim 2 wherein said unidirectional means includes: (i) a first diode connected with its anode to the second junction and with its cathode to a third junction; and (ii) a second diode connected with its anode to the third junction and its cathode to the first junction.

4. The arrangement of claim 3 additionally including impedance means connected in circuit between the third junction and the inverter output.

5. The arrangement of claim 1 wherein: (i) the first energy-storing capacitor has a first capacitance and a first DC voltage across its terminals; (ii) the second energy-storing capacitor has a second capacitance and a second DC voltage across its terminals; (iii) the first DC voltage has an absolute magnitude that is substantially constant and approximately equal to or larger than half of the absolute peak magnitude of the source voltage.

6. The arrangement of claim 5 wherein the first DC voltage is substantially equal in magnitude to the second DC voltage.

7. The arrangement of claim 5 wherein the first capacitance is approximately equal to the second capacitance.

8. The arrangement of claim 1 wherein: (i) the first energy-storing capacitor is periodically and intermittently discharged; and (ii) the second energy-storing capacitor is discharged substantially at the same times as the first energy-storing capacitor discharged is being discharged.

9. The arrangement of claim 8 wherein, at any time when the first energy-storing capacitor is being discharged, the magnitude of any DC voltage present across its terminals is substantially equal to any DC voltage present across the terminals of the second energy-storing capacitor.

10. The arrangement of claim 1 wherein: (i) the loading means is additionally characterized by including a series-tuned L-C circuit connected with the inverter output; and (ii) the series-tuned L-C circuit has a natural resonance frequency approximately equal to the fundamental frequency of the high-frequency current.

11. The arrangement of claim 1 wherein the electric power source includes: (i) an ordinary electric utility power line providing a power line voltage at a pair of power line terminals; and (ii) an inductor means connected in circuit between these power line terminals and the source terminals.

12. An arrangement comprising:

a pair of AC source terminals across which is provided an AC source voltage;

full-wave rectifier means having: (i) a pair of AC input terminals connected with the AC source terminals; and (ii) a pair of DC output terminals; and DC loading means having a pair of DC loading terminals connected with the DC output terminals and operative to draw a DC load current therefrom; the DC loading terminals including a B− terminal and a B+ terminal; the DC loading means being characterized by including:

(i) a pair of output terminals across which is connected a gas discharge lamp means;

(ii) a first series-combination connected across the DC loading terminals; the first series-combination including a first rectifier and a first energy-storing capacitor; the first rectifier having a cathode connected directly with the B+ terminal; the first energy-storing capacitor having a terminal connected directly with the B− terminal; and (iii) a second series-combination connected across the DC loading terminals; the second series-combination including a second rectifier and a second energy-storing capacitor; the second rectifier having an anode connected directly with the B− terminal; the second energy-storing capacitor having a terminal connected directly with the B+ terminal.

13. The arrangement of claim 12 wherein: (i) the DC loading means is additionally characterized by including an inverter means connected in circuit with the DC loading terminals as well as with the output terminals; and (ii) the inverter means is operative to provide a high-frequency voltage across the gas discharge lamp means.

14. The arrangement of claim 12 wherein: (i) the anode of the first rectifier is connected with the cathode of the second rectifier by way of a third rectifier means; and (ii) the third rectifier means has a cathode connected with the anode of the first rectifier and an anode connected with the cathode of the second rectifier.

15. The arrangement of claim 12 wherein the first energy-storing capacitor has a capacitance approximately equal to that of the second energy-storing capacitor.

16. An arrangement comprising:

a source providing an AC source voltage at a pair of AC source terminals;

full-wave rectifier means having: (i) a pair of AC input terminals connected with the AC source terminals, and (ii) a pair of DC output terminals including a negative terminal and a positive terminal;

power conditioning means having a pair of DC input terminals and a pair of AC output terminals; the DC input terminals being connected with the DC output terminals; the power conditioning means being characterized by including: (i) first energy-storing capacitor means connected between the negative terminal and a first junction terminal; (ii) first rectifier means having an anode connected with the first junction terminal and a cathode connected with the positive terminal; (iii) second energy-storing capacitor means connected between the positive terminal and a second junction terminal; (iv) second rectifier means having a cathode connected with the second junction terminal and an anode connected with the negative terminal; (v) shunting rectifier means having a cathode connected with the first junction terminal and an anode connected with the second junction terminal, thereby to permit substantially free flow of positive current from the second junction terminal to the first junction terminal while preventing positive current from flowing from the second junction terminal to the first junction terminal; and (vi) inverter means connected in circuit with the DC input terminal and the AC output terminals, the inverter means being operative to supply a high-frequency current from the AC output terminal; and gas discharge lamp means having a pair of lamp terminals connected with the AC output terminals.

17. The arrangement of claim 16 wherein the shunting rectifier means includes: (i) a first shunt rectifier connected with its cathode to the first junction terminal and with its anode to a center terminal; and (ii) a second shunt rectifier connected with its cathode to the center terminal and with its anode to the second junction terminal.

18. The arrangement of claim 17 including means operative periodically to cause an alternating current be supplied to the center terminal, thereby periodically to cause at least one of the energy-storing capacitor means to be charged.

19. An arrangement comprising:
   a source providing an AC source voltage at a pair of AC source terminals;
   full-wave rectifier means having: (a) a pair of AC input terminals connected with the AC source terminals, and (b) a pair of DC output terminals including a negative terminal and a positive terminal;
   gas discharge lamp having a pair of lamp terminals; and
   power conditioning means having: (a) a pair of DC input terminals connected in circuit with the DC output terminals, there being a DC supply voltage present between the DC input terminals; and (b) a pair of AC output terminals connected with the lamp terminals; the power conditioning means being characterized by including:
      (i) a first energy-storing capacitor having a first pair of capacitor terminals across which a first DC voltage exists;
      (ii) a second energy-storing capacitor having a second pair of capacitor terminals across which a second DC voltage exists; and
      (iii) means connected in circuit between the capacitor terminals and the AC output terminals; the means being operative: (a) to cause current to be supplied from the DC input terminals to the two energy-storing capacitors, but only when the magnitude of the DC supply voltage is larger than the sum of the first DC voltage and the second DC voltage; and (b) to cause the first energy-storing capacitor)to supply current to the DC input terminals whenever the magnitude of the DC supply voltage is lower than that of the first DC voltage.

20. The arrangement of claim 19 wherein the source: (i) is connected with a pair of power line terminals at which is provided an ordinary AC power line voltage; and (ii) includes impedance means connected in circuit between the power line terminals and the AC source terminals.

21. An arrangement comprising:
   an AC source operative to provide an AC power line voltage at a pair of power line terminals;
   a gas discharge lamp having a pair of lamp terminals; and
   a conditioner circuit having a pair of input terminals connected with the power line terminals and a pair of output terminals connected with the lamp terminals; the conditioner circuit being characterized by:
      (a) being functional to supply a lamp current to the lamp terminals;
      (b) including a pair of DC terminals across which exists a DC voltage; the DC voltage: (i) being periodic; (ii) having a DC period, (iii) varying periodically in magnitude between a minimum level and a maximum level; the maximum level having an absolute magnitude about equal to the absolute peak magnitude of the AC power line voltage; the minimum level having an absolute magnitude about equal to or lower than half of the absolute peak magnitude of the AC power line voltage; and
      (c) including: (i) a first energy-storing capacitor having a first pair of capacitor terminals across which exists a first capacitor voltage, and (ii) a second energy-storing capacitor having a second pair of capacitor terminals across which exists a second capacitor voltage; the sum of the first capacitor voltage and the second capacitor voltage being defined as the sum capacitor voltage; the sum capacitor voltage varying periodically between a minimum sum magnitude and a maximum sum magnitude; the maximum sum magnitude having an absolute value about equal to or higher than that of the peak AC power line voltage.

22. The arrangement of claim 21 wherein said minimum level is equal to about half of the minimum sum magnitude.

23. The arrangement of claim 21 wherein the DC voltage is further characterized by alternating between a first and a second mode; the first mode being one wherein its absolute magnitude is substantially equal to that of the AC power line voltage; the second mode being one wherein its absolute magnitude is gradually declining; the first mode having a first duration; the second mode having a second duration; the sum of the first duration and the second duration being equal to the duration of the DC period.

24. The arrangement of claim 21 wherein a power line current flows between the power line terminals and the input terminals whenever the absolute magnitude of the AC power line voltage exceeds that of the sum capacitor voltage.

25. The arrangement of claim 21 wherein the conditioner circuit is additionally characterized by including an inverter circuit connected between the pair of DC terminals and the pair of lamp terminals.

26. An arrangement comprising:
   an AC source operative to provide an AC voltage at a pair of AC terminals; the AC voltage having a fundamental period consisting of two half-periods; each half-period having a certain duration;
   a gas discharge lamp having a pair of lamp terminals; and
   a conditioner circuit having a pair of input terminals connected with the AC terminals and a pair of output terminals connected with the lamp terminals; the conditioner circuit being characterized by:
      (a) being functional to supply a lamp current to the lamp terminals;
      (b) including: (i) a first energy-storing capacitor having a first pair of capacitor terminals across which exists a first capacitor voltage, and (ii) a second energy-storing capacitor having a second pair of capacitor terminals across which exists a second capacitor voltage; the sum of the first capacitor voltage and the second capacitor voltage being defined as the sum capacitor voltage; the first and the second energy-storing capacitors each being charged only during a first part of each of said half-periods and discharged only, during a second part of each of said half-periods; the first part having a first duration; the second part having a second duration; the sum of the first duration and the second duration being equal to said certain duration; and (c) having a pair of DC terminals across which exists a DC voltage; the DC voltage: (i) being periodic, (ii) having a period, (iii) having a peak magnitude that is manifestly prevented from exceeding the magnitude of the sum capacitor voltage by more than about twice the forward voltage drop of an ordinary semiconductor diode, and (iv) having an instantaneous absolute magnitude which, at least during the first duration, is substantially equal to the instantaneous absolute magnitude of the AC voltage.

27. The arrangement of claim 26 wherein the conditioner circuit is further characterized by having a conductive path whereby electric current may flow from the DC terminals and into the two energy-storing capacitors without incurring a voltage drop in excess of twice the forward voltage drop of an ordinary. semiconductor diode.

28. The arrangement of claim 26 wherein the DC voltage alternates periodically between a first and a second mode; the first mode being one wherein its absolute magnitude is substantially equal to that of the AC voltage; the second mode being one wherein its absolute magnitude is gradually declining; the duration of the first mode added to that of the second mode being equal to said certain duration.

29. The arrangement of claim 26 wherein the capacitance of the first energy-storing capacitor is approximately equal to that of the second energy-storing capacitor.

30. An arrangement comprising:

an AC source operative to provide an AC voltage at a pair of AC terminals; the AC voltage having a fundamental period consisting of two half-periods; each half-period having a certain duration;

a gas discharge lamp having a pair of lamp terminals; and a conditioner circuit having a pair of input terminals connected with the AC terminals and a pair of output terminals connected with the lamp terminals; the conditioner circuit being characterized by:
  (a) being functional to supply a lamp current to the lamp terminals;
  (b) including: (i) a first energy-storing capacitor having a first pair of capacitor terminals across which exists a first capacitor voltage, and (ii) a second energy-storing capacitor having a second pair of capacitor terminals across which exists a second capacitor voltage; the sum of the first capacitor voltage and the second capacitor voltage being defined as the sum capacitor voltage; the sum capacitor voltage varying periodically between a minimum absolute magnitude and a maximum absolute magnitude; and
  (c) including a positive DC terminal and a negative DC terminal, across which terminals exists a DC voltage; the magnitude of the DC voltage varying periodically between a maximum level and a minimum level; the maximum level being prevented from substantially exceeding the magnitude of the sum capacitor voltage.

31. An arrangement comprising:

an AC source operative to provide an AC voltage at a pair of AC terminals; the AC voltage having a fundamental period consisting of two half-periods; each half-period having a certain duration;

a gas discharge lamp having a pair of lamp terminals; and a conditioner circuit having a pair of input terminals connected with the AC terminals and a pair of output terminals connected with the lamp terminals; the conditioner circuit being characterized by:
  (a) being functional to supply a lamp current to the lamp terminals;
  (b) including: (i) a first energy-storing capacitor having a first pair of capacitor terminals across which exists a first capacitor voltage, and (ii) a second energy-storing capacitor having a second pair of capacitor terminals across which exists a second capacitor voltage; the sum of the first capacitor voltage and the second capacitor voltage being defined as the sum capacitor voltage; the sum capacitor voltage varying periodically between a minimum absolute magnitude and a maximum absolute magnitude; and
  (c) including a pair of DC terminals connected with the AC terminals by way of a rectifier assembly operative to cause current to flow from the AC terminals to the DC terminals whenever the absolute magnitude of the AC voltage exceeds that of the DC voltage by more than the forward voltage drop of a pair of rectifier diodes.

* * * * *